(12) United States Patent
Lin et al.

(10) Patent No.: US 10,564,706 B2
(45) Date of Patent: Feb. 18, 2020

(54) POWER SOURCE TOLERANCE ANALYSIS METHOD AND SYSTEM

(71) Applicant: INDUSTRIAL TECHNOLOGY RESEARCH INSTITUTE, Chutung, Hsinchu (TW)

(72) Inventors: Chang-Tzu Lin, Zhubei (TW); Ding-Ming Kwai, Zhubei (TW); I-Hsuan Lee, Hsinchu (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 327 days.

(21) Appl. No.: 15/389,058

(22) Filed: Dec. 22, 2016

(65) Prior Publication Data

US 2018/0157314 A1    Jun. 7, 2018

(30) Foreign Application Priority Data

Dec. 1, 2016   (TW) .............................. 105139694 A

(51) Int. Cl.
| G06F 1/3296 | (2019.01) |
| G06F 1/3287 | (2019.01) |
| G06F 17/50 | (2006.01) |

(52) U.S. Cl.
CPC .......... *G06F 1/3296* (2013.01); *G06F 1/3287* (2013.01); *G06F 17/5036* (2013.01); *G06F 2217/78* (2013.01)

(58) Field of Classification Search
CPC .............................. G06F 1/3296; G06F 1/3287
See application file for complete search history.

(56) References Cited

U.S. PATENT DOCUMENTS

| 8,276,110 B2 | 9/2012 | Baviskar et al. |
| 8,539,422 B2 | 9/2013 | Dai et al. |
| 8,549,460 B2 | 10/2013 | Law et al. |
| 8,689,160 B2 | 4/2014 | Lin et al. |

(Continued)

FOREIGN PATENT DOCUMENTS

| CN | 102651038 A | 8/2012 |
| CN | 105738799 A | 7/2016 |

(Continued)

OTHER PUBLICATIONS

Manjunath Shevgoor et al, Quantifying the Relationship between the Power Delivery Network and Architectural Policies in a 3D-Stacked Memory Device, MICRO-46 Dec. 7-11, 2013, Davis, CA, USA (Year: 2013).*

(Continued)

*Primary Examiner* — Rehana Perveen
*Assistant Examiner* — Chuen-Meei Gan
(74) *Attorney, Agent, or Firm* — Muncy, Geissler, Olds & Lowe, P.C.

(57) ABSTRACT

A power source analysis method includes receiving a target number, performing voltage drop analysis on a plurality of power sources in a power delivery network (PDN) to determine respective supply currents of the power sources, sorting the supply currents of the power sources, and selecting a plurality of target power sources from the power sources according to a sorted result. The total number of the selected target power sources equals the target number.

13 Claims, 3 Drawing Sheets

(56) References Cited

U.S. PATENT DOCUMENTS

| | | | |
|---|---|---|---|
| 8,742,618 B2 | 6/2014 | Chuang et al. | |
| 8,806,233 B2 | 8/2014 | Soman | |
| 9,098,671 B2 | 8/2015 | Ding et al. | |
| 9,135,390 B2 | 9/2015 | Jang et al. | |
| 9,183,345 B2 | 11/2015 | Lin et al. | |
| 2006/0031795 A1* | 2/2006 | Rahmat | G06F 17/5081 716/111 |
| 2006/0265681 A1* | 11/2006 | Bakir | G06F 17/5036 716/120 |
| 2011/0095801 A1 | 4/2011 | Bjerregaard et al. | |
| 2012/0242149 A1 | 9/2012 | Chuang et al. | |
| 2014/0359550 A1* | 12/2014 | Ding | G06F 17/5081 716/136 |
| 2016/0181803 A1* | 6/2016 | Krishnamurthy | H02J 3/00 307/31 |
| 2017/0023961 A1* | 1/2017 | Lin | G05F 1/625 |

FOREIGN PATENT DOCUMENTS

| | | |
|---|---|---|
| TW | 201122879 A1 | 7/2011 |
| TW | 201218343 A1 | 5/2012 |
| TW | I445150 | 7/2014 |

OTHER PUBLICATIONS

Online website: Selection Sort, http://www.algolist.net/Algorithrns/Sorting/Selection sort, p. 1-3, 2009 (Year: 2009).*

Loi et al., "A Low-overhead Fault Tolerance Scheme for TSV-based 3D Network on Chip Links," International Conference on Computer Aided Design (ICCAD), Nov. 10-13, 2008, pp. 598-602.

Cheng et al., "On-line Error Detection and Correction Techniques for TSV in Three-dimensinoal Integrated Circuit," 2011 International Symposium on Intelligent Signal Processing and Communications Systems (ISPACS), Dec. 7-9, 2011, pp. 1-5.

Jiang et al., "On Effective TSV Repair for 3D-Stacked ICs," Design, Automation & Test in Europe Conference & Exhibition, Desden, Germany, Mar. 12-16, 2012, pp. 793-798.

Lo et al., "Architecture of Ring-based Redundant TSV for Clustered Faults," Design, Automation & Test in Europe Conference & Exhibition, Grenoble, France, Mar. 9-13, 2015, pp. 848-853.

Bhooshan, "Novel and Efficient IR-Drop Models for Designing Power Distribution Network for Sub-100nm Integrated Circuits," Proceedings of the $8^{th}$ International Symposium on Quality Electronic Design (ISQED), Mar. 26-28, 2007, pp. 287-292.

Nithin et al., "Dynamic Voltage (IR) Drop Analysis and Design Closure: Issues and Challenges," $11^{th}$ International Symposium on Quality Electronic Design (ISQED), Mar. 22-24, 2010, pp. 611-617.

* cited by examiner

POWER SOURCE TOLERANCE ANALYSIS METHOD AND SYSTEM

This application claims the benefit of Taiwan application Serial No. 105139694, filed Dec. 1, 2016, the disclosure of which is incorporated by reference herein in its entirety.

TECHNICAL FIELD

The disclosure relates to a power source tolerance analysis method and system.

BACKGROUND

The development of the integrated circuit industry is inclined towards multi-chip integration. A three-dimensional (3D) integrated circuit (IC) in a stacked package has a reduced routing length among chips and shortened signal transmission time among chips, and has thus become one of the mainstream technologies. In the three-dimensional integrated circuit technology, through-silicon vias (TSV) and bumps can provide interconnections among chips, and may also serve as power sources.

However, process yield of TSVs and bumps are currently rather low. The reliability of a power delivery network (PDN) of a chip is hence degraded while production cost of the integrated circuit is increased.

Therefore, there is a need for a solution that simulates and identifies in advance a power source likely causing a fault in the PDN and provides associated information as reference for subsequently repairing/reinforcing the PDN, so as to enhance the reliability of the PDN.

SUMMARY

The disclosure is directed to a power source tolerance analysis method applied to a computerized integrated circuit design process. The power source analysis method includes receiving a target number, performing a voltage drop analysis on a plurality of power sources in a power delivery network (PDN) to determine respective supply currents of the power sources, sorting the supply currents of the power sources, and selecting a plurality of target power sources from the power sources according to a sorted result. A total number of the selected target power sources equals the target number.

The disclosure is further directed to a power source tolerance analysis system. The power source tolerance analysis system includes: a storage device, storing a program; a processor, coupled to the storage device; and a display device, coupled to the processor, controlled by the processor to display. When the processor loads the program from the storage device, the processor performs operations of receiving a target number, performing a voltage drop analysis on a plurality of power sources in a power delivery network (PDN) to determine respective supply currents of the power sources, sorting the supply currents of the power sources, and selecting a plurality target power sources from the power sources according to a sorted result. A total number of the selected target power sources equals the target number.

Figure 1:
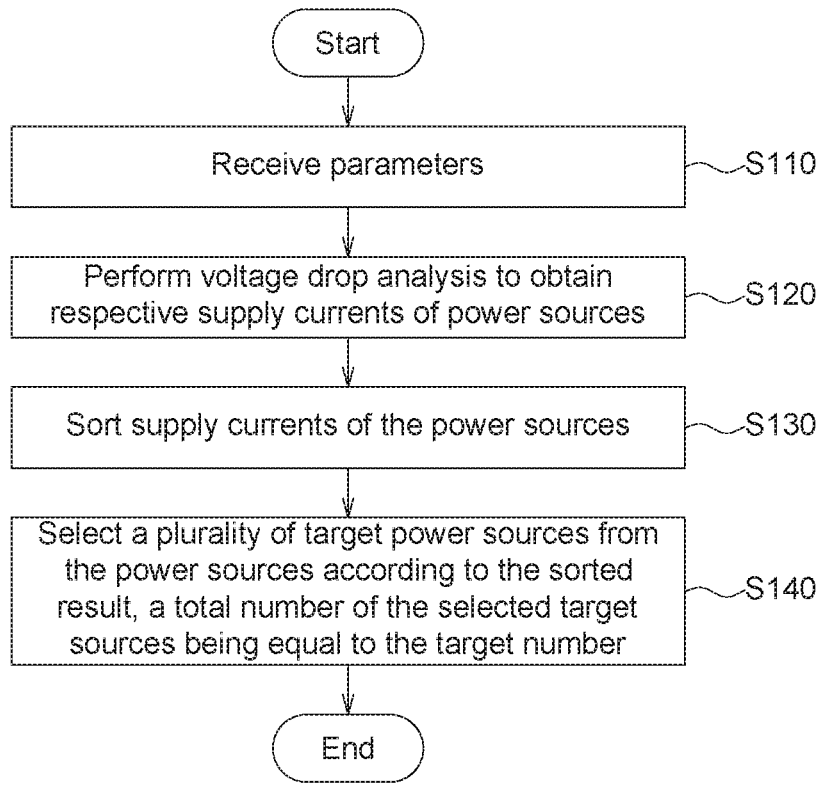
FIG. 1 is a flowchart of a power source tolerance analysis method according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Technical terms of the application are based on the general definition in the technical field of the application. If the application describes or explains one or some terms, definitions of the terms are based on the description or explanation of the application. The embodiments of the disclosure respectively include one or multiple technical features. In possible implementation, one skilled person in the art may selectively implement a part or all of the technical features in any of the embodiments, or selective combine a part or all of the technical features in any of the embodiments.

Commercial integrated circuit design processes currently include, for example but not limited to, 1) layout planning and power delivery network (PDN) designing; 2) simulating positions and power consumptions of a plurality of standard devices; 3) clock tree synthesis; 4) routing; 5) voltage drop analysis; and 6) tolerance operation.

In one embodiment, the power source tolerance analysis method and system are compatible to current commercial (automated/computerized) integrated circuit design processes. For example, the power source tolerance analysis method and system may be applied to, for example but not limited to, the above process (6) of performing a tolerance operation.

FIG. 1 shows a flowchart of a power source tolerance analysis method according to an embodiment. As shown in FIG. 1, in step S110, a set of parameters are received. The received parameters include, for example but not limited to, a PDN, a plurality of power sources in the PDN, position parameters of the power sources in the PDN, a target number N (where N is a positive integer), respective power consumption parameters of a plurality of standard devices placed in the PDN, and/or respective position parameters of these standard devices. The target number N can be inputted, determined and/or modified by a user. In one embodiment, the power sources in the PDN can be either all of the power sources or partial power sources in the PDN. In one embodiment, the number of the power sources in the PDN is T. T is a positive integer.

In step S120, a voltage drop analysis is performed on the power sources in the PDN to obtain respective supply currents of the power sources. In one embodiment, when the voltage drop analysis is performed, the PDN, the power sources in the PDN, the respective position parameters of the power sources in the PDN, the respective power consumption parameters of the standard devices, and/or the respective position parameters of the standard devices are considered.

In step S130, the supply currents of the power sources are sorted, e.g., sorted in a descending order, an ascending order or other types of orders.

In step S140, a plurality of target power sources are selected from the power sources according to the sorted result. A total number of the selected target power sources equals the target number.

Figure 2A:
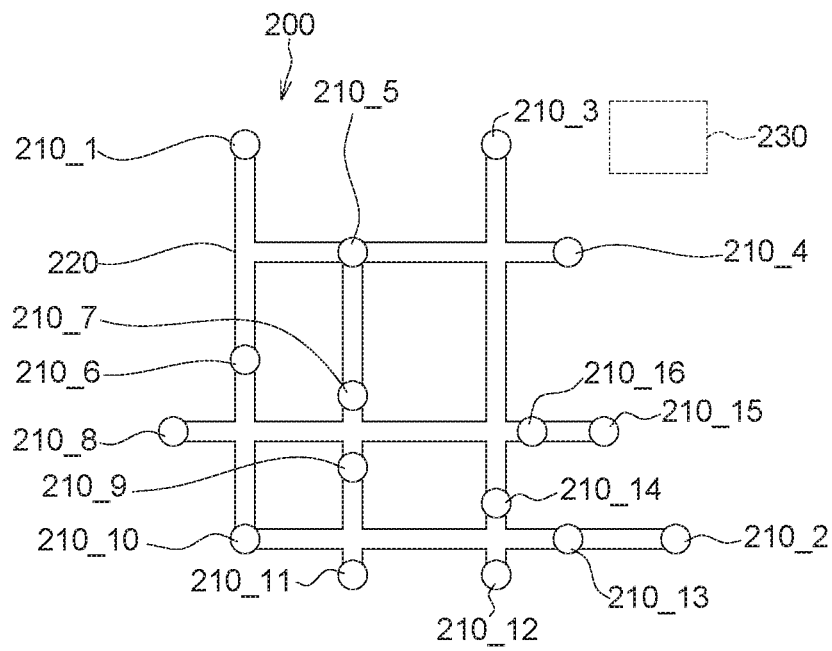
FIG. 2A is an example of a power delivery network (PDN)
Figure 2B:
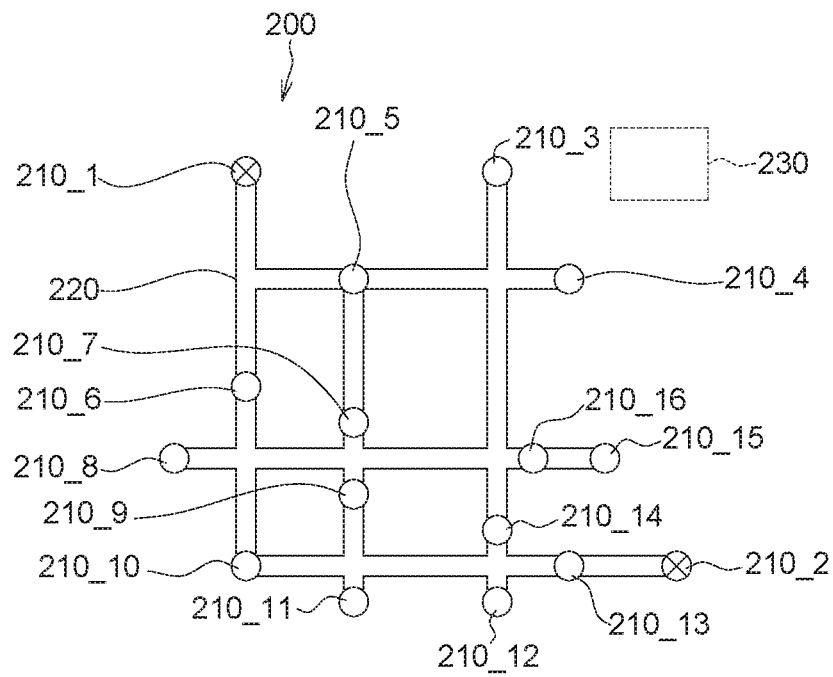
FIG. 2B is a schematic diagram of selecting power sources.
Figure 2C:
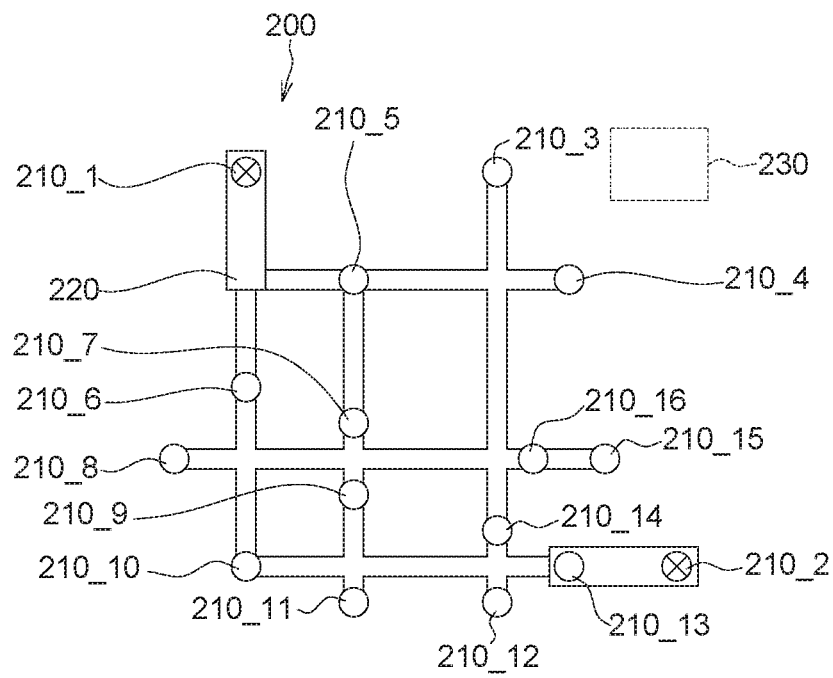
FIG. 2C is a schematic diagram of widening power lines (associated with selected power sources)

Referring to FIG. 2A to FIG. 2C, FIG. 2A shows an example of a PDN. As shown in FIG. 2A, a PDN 200 includes a plurality of power sources 210_1 to 210_16 and a plurality of power lines 220. In FIG. 2A, 16 power sources are given as an example but not a limitation to the disclosure. The power lines 220 are connected to or coupled to the power sources 210_1 to 210_16. Types of the power sources can be either bumps or through-silicon vias (TSVs). In other embodiments, power sources may include other types, which are encompassed within the spirit of the disclosure.

Further, a plurality of standard devices are placed under the PDN. A position for placing one standard device 230 is depicted in FIG. 2A as an example. In an alternative embodiment, a chip may include multiple standard devices, multiple electronic devices, multiple silicon intellectual property devices and/or multiple other devices.

The term "target number N" refers to the number of the selected target power sources. In one embodiment, the N target power sources are determined through analysis and/or simulation. In the event of a fault occurring in one or more or all of the N selected target power source(s), the fault target power sources may cause an undesirable effect on the voltage drop of the PDN. More specifically, in one embodiment of the present invention, repair may be performed on one or multiple selected target power sources.

Referring to FIG. 2B and FIG. 2C, FIG. 2B shows a schematic diagram of the target power sources 210_1 and 210_2 that are selected (and indicated by X); FIG. 2C shows a schematic diagram of widening power lines (i.e., repairing the PDN) associated with the selected target power sources 210_1 and 210_2. Details of repairing the PDN are omitted herein.

Figure 3:
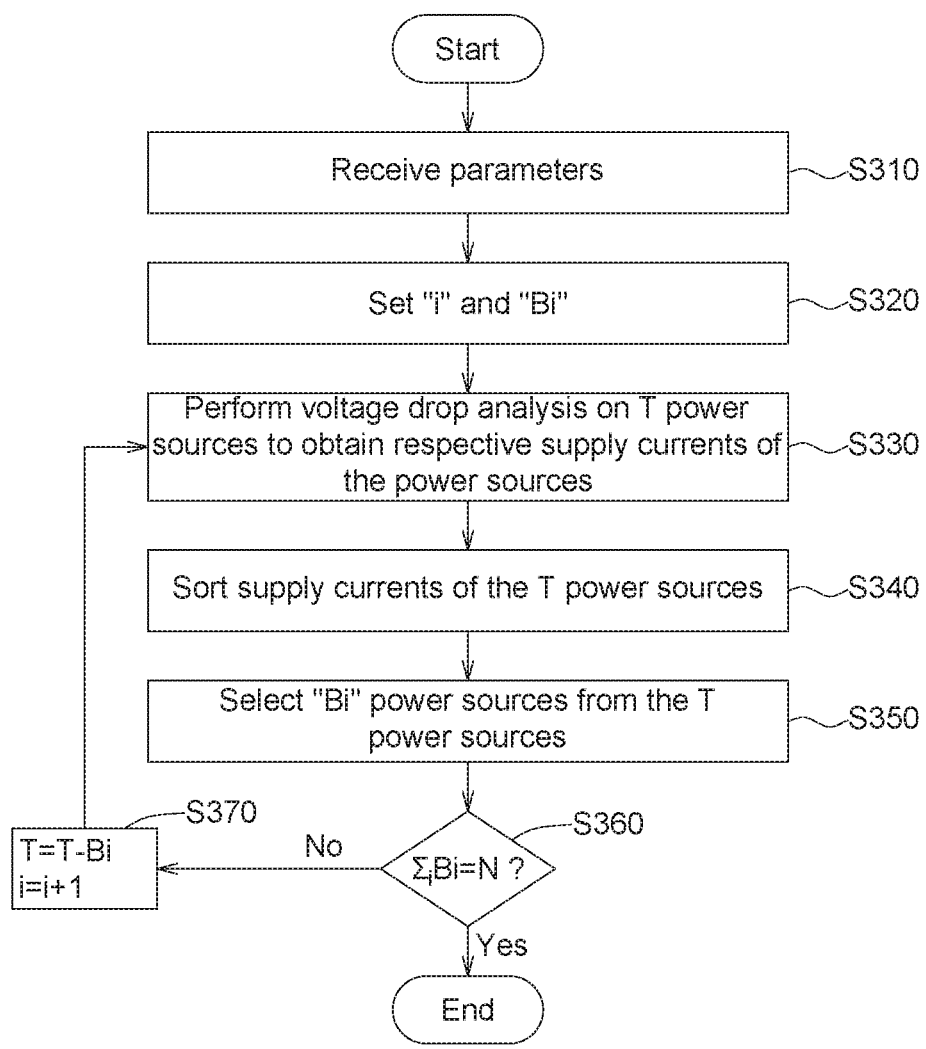
FIG. 3 is a flowchart of a power source tolerance analysis method according to another embodiment.

FIG. 3 shows a flowchart of a power source analysis tolerance method according to another embodiment. Step S310 may be identical or similar to step S110, and associated details are omitted herein.

In step S320, two parameters "i" and "Bi" (both being natural numbers) are set. The parameter "i" represents an $i^{th}$ iterative number, and the parameter "Bi" represents the number of target power sources selected in an $i^{th}$ iteration (or referred to as a parameter of iterative target power source number). The default value of the iterative parameter "i" is 1. Details for setting the parameter of iterative target power source number "Bi" are given shortly. In one embodiment, the parameter "i" and/or the parameter "Bi" may be received in step S310.

In step S330, a voltage drop analysis is performed on T power sources to obtain respective supply currents of the power sources. The parameter T represents a total number of power sources under the analysis. In another embodiment, the number T of power sources under the analysis in the $1^{st}$ iteration does not necessarily include all of the power sources in the PDN. That is, T may be smaller than the total power source number in the PDN (where the default value of T may be inputted, determined and/or modified by a user). In the above situation, the number of power sources under the analysis in the $1^{st}$ iteration is not necessarily the number of all of the power sources in the PDN. In FIG. 2A to FIG. 2C, T=16 for example. In one embodiment, the number of power sources in one chip or the number of power sources under analysis may be as many as above 500. Thus, in one embodiment, T may be greater than or equal to 500.

In step S340, the respective supply currents of the T power sources are sorted (for example but not limited to, sorting in a descending or ascending order). In the description below, sorting in a descending order is given as an example.

In step S350, from the T power sources, "Bi" target power sources are selected. In step S350, after analysis and/or simulation, "Bi" target power sources are selected from the T power sources. One principle for the selection is that, in the event of a fault in the "Bi" target power source(s) (rather than the "Bi" target power source(s) already currently containing a fault, a fault may be later caused in the "Bi" target power source(s) due to a broken wire in the TSV or a disengaged bump in a subsequent process), the "Bi" target power source(s) may cause a severe, worse or worst effect on the voltage drop of the PDN.

In step S360, it is checked whether $\Sigma_i Bi$ is equal to N, wherein $\Sigma_i Bi$ represent the sum of all "Bi" from the $1^{st}$ to the $i^{th}$ iterations, and the parameter N represents the target number (wherein the target number is inputted in step S110 or S310 and may be determined by a user). That is to say, in step S360, it is checked whether the number of the target power sources selected from the $1^{st}$ to the $i^{th}$ iterations has reached the target number N. The process ends when $\Sigma_i Bi$ is equal to N. When $\Sigma_i Bi$ is smaller than N, it means that the number of target power sources selected from the $1^{st}$ to the $i^{th}$ iterations has not yet reached the target number N, and the process proceeds to step S370.

In step S370, the parameter T is updated to T=T−Bi, and the parameter "i" is updated (i=i+1). That is, in step S370, the target power sources selected from the $1^{st}$ to the $i^{th}$ iterations are eliminated, and a next iteration is performed. Steps S330 to S370 are repeated until $\Sigma_i Bi$ is equal to N (the total number of the selected target power sources has reached the target number), and the process ends. That is, in step S340, when the voltage drop analysis is performed, all of the selected target power sources (in a number $\Sigma_i Bi$) are eliminated, and the voltage drop analysis is performed on the remaining power sources.

Details for selecting the Bi target power sources from the T power sources in each iteration according to the supply currents of the power sources in the embodiment are given below. It should be noted that, FIG. 2A is taken as an example but not a limitation to the disclosure.

Embodiment A (Strictly Monotonously Decreasing)

TABLE 1

| Embodiment A (strictly monotonically decreasing) | |
|---|---|
| "i" | "Bi" |
| 1 | 5 |
| 2 | 3 |
| 3 | 2 |

In the embodiment A, one principle for setting the target power source number parameter "Bi" is strictly monotonically decreasing; i.e., the iteration target power source number parameter "Bi" selected in the previous iteration is greater than the iteration target power source number parameter "Bi" selected in the next iteration. From Table-1, B1=5, B2=3, B2=3; B1 is greater than B2, and B2 is greater than B3.

An example in which the default value of the total number T of power sources under analysis is 16 and the target number N is 10 is given below. As seen from Table-1 and FIG. 2A, in the $1^{st}$ iteration, after the voltage drop analysis is performed, 5 target power sources are selected from 16 (T) power sources, and the supply currents of these 5 target power sources are the largest 5 among the supply currents of the 16 power sources. For example, a result of the $1^{st}$ iteration voltage drop analysis indicates that the supply currents of the power sources 210_1 to 210_5 are the largest 5, and so the target power sources 210_1 to 210_5 are selected.

In the $2^{nd}$ iteration of voltage drop analysis, as 5 target power sources are previously selected from the 16 power sources in the $1^{st}$ iteration, the voltage drop analysis is performed on the 11 (16−5=11) power sources (i.e., the target power sources selected in the previous iteration are eliminated, and the number T of the power sources under analysis in the $2^{nd}$ iteration is 11). From these 11 power sources, 3 target power sources having 3 largest supply currents are selected. For example, the result of the voltage drop analysis of the $2^{nd}$ iteration indicates that the supply currents of the power sources 210_6 to 210_8 are the largest 3, and so the target power sources 210_6 to 210_8 are selected.

In the $3^{rd}$ iteration of voltage drop analysis, the voltage drop analysis is performed on 8 (16−5−3=8) power sources. That is, in the $3^{rd}$ iteration, the target power sources selected in the previous 2 iterations are eliminated, the number T of power sources under analysis in the $3^{rd}$ iteration is 8. From these 8 power sources, 2 target power sources having 2 largest supply currents are selected. For example, the result of the voltage drop analysis of the $3^{rd}$ iteration indicates that the supply currents of the power sources 210_9 and 210_10 are the largest 2, and so the target power sources 210_9 and 210_10 are selected.

That is, observed from the embodiment A, after 3 iterations, the target power sources 210_1 to 210_10 are selected. In a subsequent PDN reinforcement/repair process, these 10 target power sources 210_1 to 210_10 may be processed for PDN reinforcement/repair. One reason for such is that, if a fault occurs in one or multiple of the 10 target power sources, a worse or even worst effect may be caused on the voltage drop of the PDN.

Embodiment B (Monotonically Decreasing)

TABLE 2

Embodiment B (monotonically decreasing)

| "i" | "Bi" |
|---|---|
| 1 | 5 |
| 2 | 2 |
| 3 | 2 |
| 4 | 1 |

In the embodiment B, one principle for setting the iteration target power source number parameter "Bi" monotonically decreasing; that is, the iteration target power source number parameter "Bi" selected in the previous iteration is greater than or equal to the iteration target power source number parameter "Bi" selected in the next iteration. As seen from Table-2, B1=5, B2=2, B3=2, B4=1; B1 is greater than B2, B2 is equal to B3, and B3 is greater than B4. An example in which the default value of the total number T of the power sources under analysis is 16 and the target number N is 10 is given below.

As seen from Table-2 and FIG. 2A, in the $1^{st}$ iteration, after the voltage drop analysis is performed, 5 target power sources are selected from 16 (T) power sources, and the supply currents of these 5 target power sources are the largest 5 among the supply currents of the 16 power sources. For example, a result of the $1^{st}$ iteration voltage drop analysis indicates that the supply currents of the power sources 210_1 to 210_5 are the largest 5, and so the target power sources 210_1 to 210_5 are selected.

In the $2^{nd}$ iteration of voltage drop analysis, as 5 target power sources are previously selected from the 16 power sources in the $1^{st}$ iteration, the voltage drop analysis is performed on the 11 (16−5=11) power sources (i.e., the target power sources selected in the previous iteration are eliminated, and the number T of the power sources under analysis in the $2^{nd}$ iteration is 11). From these 11 power sources, 2 target power sources having 2 largest supply currents are selected. For example, the result of the voltage drop analysis of the $2^{nd}$ iteration indicates that the supply currents of the power sources 210_6 and 210_7 are the largest 2, and so the target power sources 210_6 and 210_7 are selected.

In the $3^{rd}$ iteration of voltage drop analysis, the voltage drop analysis is performed on 9 (16−5−2=9) power sources. That is, in the $3^{rd}$ iteration, the target power sources selected in the previous 2 iterations are eliminated, and the number T of power sources under analysis in the $3^{rd}$ iteration is 9. From these 9 power sources, 2 target power sources having 2 largest supply currents are selected. For example, the result of the voltage drop analysis of the $3^{rd}$ iteration indicates that the supply currents of the power sources 210_8 and 210_9 are the largest 2, and so the target power sources 210_8 and 210_9 are selected.

In the $4^{th}$ iteration of voltage drop analysis, the voltage drop analysis is performed on 7 (16−5−2−2=7) power sources. That is, in the $4^{th}$ iteration, the target power sources selected in the previous 3 iterations are eliminated, and the number T of power sources under analysis in the $4^{th}$ iteration is 7. From these 7 power sources, the target power source having the largest supply current is selected. For example, the result of the voltage drop analysis of the $4^{th}$ iteration indicates that the supply current of the power source 210_10 is the largest, and the target power source 210_10 is selected.

That is, observed from the embodiment B, after 4 iterations, the target power sources 210_1 to 210_10 are selected. In a subsequent PDN reinforcement/repair process, these 10 target power sources 210_1 to 210_10 may be processed for PDN reinforcement/repair.

Embodiment C (Strictly Monotonically Increasing)

TABLE 3

Embodiment C (strictly monotonically increasing)

| "i" | "Bi" |
|---|---|
| 1 | 2 |
| 2 | 3 |
| 3 | 5 |

In the embodiment C, one principle for setting the target power source number parameter "Bi" is strictly monotonically increasing; i.e., the iteration target power source number parameter "Bi" selected in the previous iteration is smaller than the iteration target power source number parameter "Bi" selected in the next iteration. As seen from Table-1, B1=2, B2=3, B2=5; B1 is smaller than B2, and B2 is smaller than B3.

As seen from Table-3 and FIG. 2A, in the $1^{st}$ iteration, after the voltage drop analysis is performed, 2 target power sources are selected from 16 (T) power sources, and the supply currents of these 2 target power sources are the largest 2 among the supply currents of the 16 power sources. For example, a result of the $1^{st}$ iteration voltage drop analysis indicates that the supply currents of the power sources 210_1 and 210_2 are the largest 2, and so the target power sources 210_1 and 210_2 are selected.

In the $2^{nd}$ iteration of voltage drop analysis, as 2 target power sources are previously selected from the 16 power sources in the $1^{st}$ iteration, the voltage drop analysis is performed on the 14 (16−2=14) power sources (i.e., the target power sources selected in the previous iteration are eliminated, and the number T of the power sources under analysis in the $2^{nd}$ iteration is 14). From these 14 power sources, 3 target power sources having 3 largest supply currents are selected. For example, the result of the voltage drop analysis of the $2^{nd}$ iteration indicates that the supply currents of the power sources 210_3 to 210_5 are the largest 3, and so the target power sources 210_3 to 210_5 are selected.

In the $3^{rd}$ iteration of voltage drop analysis, the voltage drop analysis is performed on 11 (16−2−3=11) power sources. That is, in the $3^{rd}$ iteration, the target power sources selected in the previous 2 iterations are eliminated, the number T of power sources under analysis in the $3^{rd}$ iteration is 11. From these 11 power sources, 5 target power sources having 5 largest supply currents are selected. For example, the result of the voltage drop analysis of the $3^{rd}$ iteration indicates that the supply currents of the power sources 210_6 to 210_10 are the largest 5, and so the target power sources 210_6 to 210_10 are selected.

That is, observed from the embodiment C, after 3 iterations, the target power sources 210_1 to 210_10 are selected. In a subsequent PDN reinforcement/repair process, these 10 target power sources 210_1 to 210_10 may be processed for PDN reinforcement/repair.

Embodiment D (Monotonically Increasing)

TABLE 4

Embodiment D (monotonically increasing)

| "i" | "Bi" |
|---|---|
| 1 | 1 |
| 2 | 2 |
| 3 | 2 |
| 4 | 5 |

In the embodiment D, one principle for setting the iteration target power source number parameter "Bi" is monotonically increasing; that is, the iteration target power source number parameter "Bi" selected in the previous iteration is smaller than or equal to the iteration target power source number parameter "Bi" selected in the next iteration. As seen from Table-4, B1=1, B2=2, B3=2, B4=5; B1 is smaller than B2, B2 is equal to B3, and B3 is smaller than B4. An example in which the default value of the total number T of the power sources under analysis is 16 and the target number N is 10 is given below.

As seen from Table-4 and FIG. 2A, in the $1^{st}$ iteration, after the voltage drop analysis is performed, the target power source of the largest supply current is selected from 16 (T) power sources, and the supply current of the largest power source is the largest among the supply currents of the 16 power sources. For example, a result of the $1^{st}$ iteration voltage drop analysis indicates that the supply current of the power source 210_1 the largest, and so the target power source 210_1 is selected.

In the $2^{nd}$ iteration of voltage drop analysis, the voltage drop analysis is performed on the 15 (16−1=15) power sources (i.e., in the $2^{nd}$ iteration, the target power source selected in the previous iteration is eliminated, and the number T of the power sources under analysis in the $2^{nd}$ iteration is 15). From these 15 power sources, 2 target power sources having 2 largest supply currents are selected. For example, the result of the voltage drop analysis of the $2^{nd}$ iteration indicates that the supply currents of the power sources 210_2 and 210_3 are the largest 2, and so the target power sources 210_2 and 210_3 are selected.

In the $3^{rd}$ iteration of voltage drop analysis, the voltage drop analysis is performed on 13 (16−1−2=13) power sources. That is, in the $3^{rd}$ iteration, the target power sources selected in the previous 2 iterations are eliminated, the number T of power sources under analysis in the $3^{rd}$ iteration is 13. From these 13 power sources, 2 target power sources having 2 largest supply currents are selected. For example, the result of the voltage drop analysis of the $3^{rd}$ iteration indicates that the supply currents of the power sources 210_4 and 210_5 are the largest 2, and so the target power sources 210_4 and 210_5 are selected.

In the $4^{th}$ iteration of voltage drop analysis, the voltage drop analysis is performed on 11 (16−1−2−2=11) power sources. That is, in the $4^{th}$ iteration, the target power sources selected in the previous 3 iterations are eliminated, the number T of power sources under analysis in the $3^{rd}$ iteration is 11. From these 11 power sources, 5 target power sources having the 5 largest supply currents are selected. For example, the result of the voltage drop analysis of the $4^{th}$ iteration indicates that the supply currents of the power sources 210_6 to 210_10 are the largest 5, and so the target power sources 210_6 to 210_10 are selected.

That is, observed from the embodiment D, after 4 iterations, the target power sources 210_1 to 210_10 are selected (the target number is 10). Thus, in a subsequent PDN reinforcement/repair process, these 10 target power sources 210_1 to 210_10 may be processed for PDN reinforcement/repair.

Embodiment E (Same Number of Power Source(s) Selected in Every Iteration)

TABLE 5

Embodiment E (same number of power source(s) selected in every iteration)

| "i" | "Bi" |
|---|---|
| 1 | 1 |
| 2 | 1 |
| 3 | 1 |
| 4 | 1 |

TABLE 5-continued

Embodiment E (same number of power source(s) selected in every iteration)

| "i" | "Bi" |
| --- | --- |
| 5 | 1 |
| 6 | 1 |
| 7 | 1 |
| 8 | 1 |
| 9 | 1 |
| 10 | 1 |

In the embodiment E, one principle for setting the target power source number parameter "Bi" is setting the same number of power source(s) in every iteration. An example in which the default value of the total number T of power sources under analysis is 16 is and the target number is N is given below.

As seen from Table-5 and FIG. 2A, in the $1^{st}$ iteration, after the voltage drop analysis is performed, the target power source of the largest supply current is selected from 16 (T) power sources. For example, a result of the $1^{st}$-iteration voltage drop analysis indicates that the supply current of the power source 210_1 is the largest, and so the target power source 210_1 is selected.

In the $2^{nd}$ iteration of voltage drop analysis, the voltage drop analysis is performed on the 15 (16−1=15) power sources (i.e., in the $2^{nd}$ iteration, the target power source selected in the previous iteration is eliminated, and the number T of the power sources under analysis in the $2^{nd}$ iteration is 15). From these 15 power sources, the target power sources having the largest supply current is selected. For example, the result of the voltage drop analysis of the $2^{nd}$ iteration indicates that the supply current of the power source 210_2 is the largest, and so the target power source 210_2 is selected. The same applies to the $3^{rd}$ iteration to the $10^{th}$ iteration.

That is, observed from the embodiment E, after 10 iterations, the target power sources 210_1 to 210_10 are selected (the target number is 10). In a subsequent PDN reinforcement/repair process, these 10 target power sources 210_1 to 210_10 may be processed for PDN reinforcement/repair.

Embodiment F (All Selected at Once)

TABLE 6

Embodiment F (all selected at once)

| "i" | "Bi" |
| --- | --- |
| 1 | 10 |

In the embodiment F, one principle for setting the iteration target power source number parameter "Bi" is that, all are selected at once. As seen from Table-6, B1=10. An example in which the default value of the total number T of power sources under analysis is 16 is and the target number is N is given below.

As seen from Table-6 and FIG. 2A, in the $1^{st}$ iteration, after the voltage drop analysis is performed, 10 target power sources of 10 largest supply currents are selected from 16 power sources. For example, a result of the $1^{st}$-iteration voltage drop analysis indicates that the supply currents of the power sources 210_1 to 210_10 are the 10 largest, and so the power sources 210_1 to 210_10 are selected.

That is, observed from the embodiment F, after the $1^{st}$ iteration, the target power sources 210_1 to 210_10 are selected. Thus, in a subsequent PDN reinforcement/repair process, these 10 target power sources 210_1 to 210_10 may be processed for PDN reinforcement/repair.

From the perspective of the process that selects all of the power sources at once, steps S360 and S370 may be selectively omitted. In step S320, the parameter "i" may be set to 1 and the parameter "Bi" may be set to equal to the target number N. That is, in the embodiment, step S320, step S360 and step S370 are optional steps.

In one embodiment, the target power source is selected in a plurality of iterations according to the sorted result. In these iterations, before the voltage drop analysis is performed, the target power source previously selected is eliminated (e.g., step S370), and the voltage drop analysis is performed on the power sources that are not yet selected to determine respective supply currents of the power sources that are not yet selected (e.g., step S330). Next, the supply currents of the power sources that are not yet selected are sorted (e.g., step S340), and then "Bi" target power sources are selected from the power sources that are not yet selected (e.g., step S360). In one embodiment, as the no target power source is selected in the $1^{st}$ iteration, no selected target power source needs to be eliminated.

Potential faults occurring in target power sources at different positions may affect the voltage drop differently. Thus, in the embodiment, the target power source(s) having a larger/largest effect on the voltage drop is/are determined first for a subsequent PDN repair process. It should be noted that, the determined target power source does not necessarily mean that this power source currently contains a fault. The embodiments of the disclosure may be applied to the design process of integrated circuits, so as to determine one or multiple target power sources that mostly like have a worse or worst effect on the voltage drop before a chip is actually manufactured.

Figure 4:
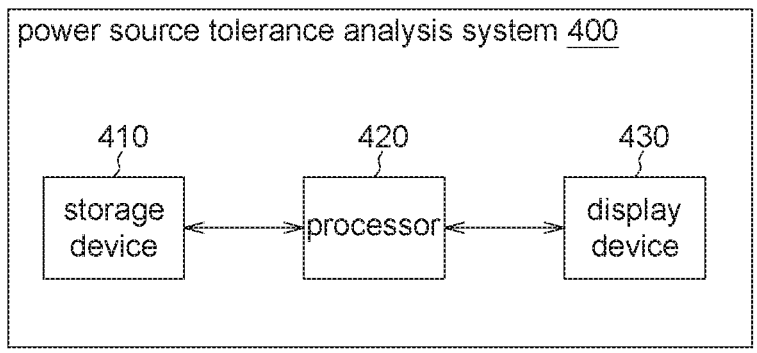
FIG. 4 is a function block diagram of a power source tolerance analysis system according to an embodiment.

FIG. 4 shows a function block diagram of a power source tolerance analysis system according to an embodiment. A power source tolerance analysis system 400 includes a storage device 410, a processor 420 and a display device 430. The storage device 410 may store programs for performing the abovementioned embodiments. The processor 420 is coupled to the storage device 410 and the display device 430. When the processor 420 loads the programs that perform the abovementioned embodiments, the processor 420 may perform the power source tolerance analysis method of the embodiments (e.g., FIG. 1 and FIG. 3), and control the display device 430 for display. Display contents of the display device 430 include, for example but not limited to, contents of the steps of the power source tolerance analysis method, or the target power sources selected in the respective iterations or the target power sources selected in the last iteration. The display contents of the display device 430 may also display at least one received parameter or at least one parameter to be received.

Experimental results of the embodiments are illustrated below.

Table-7 shows experimental results according to the embodiments A to F. In table-7, a circuit under test includes 104 power sources (T=104), and the target number N is 10.

TABLE 7

| Selection method | Worst IR % | Ratio of time spent |
|---|---|---|
| Embodiment F (all selected at once) | 5.293% | X |
| Embodiment E (one power source selected in every iteration) | 5.385% | 1 |
| Embodiment A (strictly monotonically decreasing, 5, 3, 2) | 5.385% | 0.3 |
| Embodiment C (strictly monotonically increasing, 2, 3, 5) | 5.332% | X |

In Table-7, the embodiment A (strictly monotonically decreasing, 5, 3, 2) means that, in 3 iterations, 5 target power sources, 3 target power sources and 2 target power sources are respectively selected in the $1^{st}$ to $3^{rd}$ iterations. The embodiment C (strictly monotonically increasing, 2, 3, 5) means that, in 3 iterations, 2 target power sources, 3 target power sources and 5 target power sources are respectively selected in the $1^{st}$ to $3^{rd}$ iterations. The ratio of time spent means that, assuming the time spent (for selecting one power source in every iteration) by the embodiment E is a reference (1), the time spent by the embodiment A (strictly monotonically decreasing, 5, 3, 2) is 0.3 times (where "X" in the table-7 represents "don't-care"). Thus, it is known that, the embodiment A spends less time than the embodiment E. In the embodiments in Table-7, I is the current, R is the impedance, IR is the voltage drop, IR % represents the percentage of the worst voltage drop determined in the chip divided by the source voltage. In the embodiments in Table-7, the worst IR % determined in the embodiment E (one power source selected in every iteration) and the embodiment A (strictly monotonically decreasing, 5, 3, 2) are higher than the worst IR % determined in the embodiment F (all selected at once) and the embodiment C (strictly monotonically increasing, 2, 3, 5). Thus, the embodiment A and the embodiment E are more accurate.

Table-8 shows experimental results of the embodiments A to F. In Table-8, a circuit under test includes 452 power sources (the default value of T is 452), and the target number N is 10.

TABLE 8

| Selection method | Worst IR % | Ratio of time spent |
|---|---|---|
| Embodiment F (all selected at once) | 8.52% | X |
| Embodiment E (one power source selected in every iteration) | 8.746% | 1 |
| Embodiment B (monotonically decreasing, 3, 3, 3, 1) | 8.746% | 0.4 |

In Table-8, the embodiment B (monotonically decreasing, 3, 3, 3, 1) means that, in 4 iterations, 3 target power sources, 3 target power sources, 3 target power sources and 1 target power source are respectively selected in the $1^{st}$ to $4^{th}$ iterations. Using the time spent by the embodiment E (one power source selected in every iteration) as a reference (1), the time spent by the embodiment B (monotonically decreasing, 3, 3, 3, 1) is 0.4 times. Thus, it is known that, the embodiment B spends less time than the embodiment E. Further, from the perspective of the worst IR % (in the embodiments in Table-8, IR % represents the percentage of the worst voltage drop determined in the chip divided by the source voltage), the worst IR % determined by the embodiment E (one power source selected in every iteration) and the embodiment B (monotonically decreasing, 3, 3, 3, 1) is higher than the worst IR % determined by the embodiment F (all selected at once). Thus, the accuracy of the embodiment E and the embodiment B is higher than the embodiment F.

It is known from the above embodiments and the associated experimental results that, by incorporating the yield rate of power sources into the chip design phase, the embodiments of the disclosure are capable of enhancing the reliability of the PDN during the manufacture of a chip. One reason is, the embodiments predict the target power source(s) that may have a worse/worst negative effect on the voltage drop, and provides associated information as reference for a subsequent PDN repair process.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:
1. A power source tolerance analysis method, applied to an integrated circuit design process, the power source tolerance analysis method comprising:
  receiving a target number;
  in each of a plurality of iterations,
  performing a voltage drop analysis on a plurality of power sources in a power delivery network (PDN) to determine respective supply currents of the power sources;
  wherein the step of performing the voltage drop analysis on the power sources in the PDN to determine the respective supply currents of the power sources comprises: eliminating the selected target power sources, and performing the voltage drop analysis on unselected Dower sources among the power sources to determine the respective supply currents of the unselected power source;
  sorting the supply currents of the power sources;
  wherein the step of sorting the supply currents of the power sources comprises:
  sorting the supply currents of the unselected power sources
  selecting at least one target power source from the power sources according to a sorted result,
  wherein the number of the selected target power source(s) selected in a first iteration of the plurality of iterations is larger than the number of the selected target power source(s) selected in a last iteration of the plurality of iterations and in every two consecutive iterations of the plurality of iterations, the number of the selected target power source(s) in a latter iteration is smaller than the number of the selected target power source(s) in a former iteration; or the number of the selected target power source(s) selected in the first iteration of the plurality of iterations is smaller than the number of the selected target power sources selected in the last iteration of the plurality of iterations and in every two consecutive iterations of the plurality of iterations, the number of the selected target power source(s) in a latter iteration is larger than the number of the selected target power source(s) in a former iteration;
  repeating the iterations until a total number of the target power sources selected in the plurality of iterations being equal to the target number; and
  applying the selected target power sources from the iterations in the integrated circuit design process.
2. The power source tolerance analysis method according to claim 1, wherein the step of receiving the target number comprises:

receiving a PDN, the power sources in the PDN, respective position parameters of the power sources in the PDN, respective power consumption parameters of a plurality of standard devices placed in the PDN, or respective position parameters of the standard devices.

3. The power source tolerance analysis method according to claim 2, wherein when the voltage drop analysis is performed, the respective position parameters of the power sources in the PDN, and the respective power consumption parameters of the standard devices or the respective position parameters of the standard devices placed in the PDN are considered.

4. The power source tolerance analysis method according to claim 1, wherein the step of sorting the supply currents of the power sources comprises:
sorting the supply currents of the power sources in a descending order.

5. The power source tolerance analysis method according to claim 1, wherein the step of selecting the target power sources from the power sources according to the sorted result comprises:
in the plurality of iterations, selecting the target power sources in a strictly monotonically decreasing or strictly monotonically increasing order.

6. The power source tolerance analysis method according to claim 1, wherein the step of selecting the target power sources from the power sources according to the sorted result comprises:
in the plurality of iterations, selecting the target power sources in a monotonically decreasing or monotonically increasing order.

7. A power source tolerance analysis system, comprising:
a storage device, storing a program; and
a processor, coupled to the storage device;
wherein, when the processor loads the program from the storage device, the processor performs:
receiving a target number;
in each of a plurality of iterations,
performing a voltage drop analysis on a plurality of power sources in a power delivery network (PDN) to determine respective supply currents of the power sources;
wherein the step of performing the voltage drop analysis on the power sources in the PDN to determine the respective supply currents of the power sources comprises: eliminating the selected target power sources, and performing the voltage drop analysis on unselected power sources among the power sources to determine the respective supply currents of the unselected power source;
sorting the supply currents of the power sources;
wherein the step of sorting the supply currents of the power sources comprises:
sorting the supply currents of the unselected power sources
selecting at least one target power source from the power sources according to a sorted result,
wherein the number of the selected target power source(s) selected in a first iteration of the plurality of iterations is larger than the number of the selected target power source(s) selected in a last iteration of the plurality of iterations and in every two consecutive iterations of the plurality of iterations, the number of the selected target power source(s) in a latter iteration is smaller than the number of the selected target power source(s) in a former iteration; or the number of the selected target power source(s) selected in the first iteration of the plurality of iterations is smaller than the number of the selected target power sources selected in the last iteration of the plurality of iterations and in every two consecutive iterations of the plurality of iterations, the number of the selected target power source(s) in a latter iteration is larger than the number of the selected target power source(s) in a former iteration;
repeating the iterations until a total number of the target power sources selected in the plurality of iterations being equal to the target number; and
applying the selected target power sources from the iterations in the integrated circuit design process.

8. The power source tolerance analysis system of claim 7, wherein the processor further receives a PDN, the power sources in the PDN, respective position parameters of the power sources in the PDN, respective power consumption parameters of a plurality of standard devices placed in the PDN, or respective position parameters of the standard devices.

9. The power source tolerance analysis system of claim 8, wherein when the processor performs the voltage drop analysis, the respective position parameters of the power sources, and the respective power consumption parameters of the standard devices or the respective position parameters of the standard devices placed in the PDN are considered.

10. The power source tolerance analysis system of claim 7, wherein the processor sorts the supply currents of the power sources in a descending order.

11. The power source tolerance analysis system of claim 7, wherein, in the plurality of iterations, the processor selects the target power sources in a strictly monotonically decreasing or strictly monotonically increasing order.

12. The power source tolerance analysis system of claim 7, wherein, in the plurality of iterations, the processor selects the target power sources in a monotonically decreasing or monotonically increasing order.

13. The power source tolerance analysis system of claim 7, further comprising:
a display device, coupled to the processor, controlled by the processor to display the selected target power sources, or to display at least one parameter received or at least one parameter to be received.

* * * * *